Patented Jan. 26, 1954

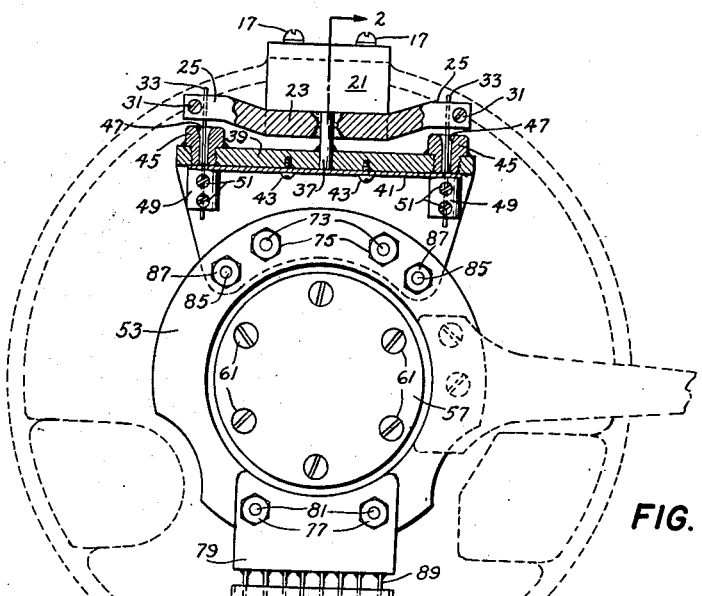

2,667,077

UNITED STATES PATENT OFFICE 2,667,077

GYROSCOPE DAMPING DEVICE

Bernard J. Baecher, Sea Cliff, N. Y.

Application August 25, 1950, Serial No. 181,542

3 Claims. (Cl. 74—5.4)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in gyroscopes, and more particularly pertains to improvements in gyroscope damping devices.

The pendulum ballistic, the controlling element that makes the sensitive element of a gyro-compass north seeking, is an inverted pendulum in conventional gyro-compass such as the Sperry Gyro-Compass Mark 18, Model 3. The unit consists essentially of an inverted pendulum weight that maintains the azimuth alignment and a repulsion magnet arrangement that damps any oscillations of the gyro about the meridian. The pendulum is a weight that is located around the north rotor bearing housing, said weight being supported by two semi-circular flat springs secured at one end to the rotor case. If the compass deviates from its true north position, the rotation of the earth will cause the rotor to tilt. The weight then will take up a position such that a torque is applied about the horizontal axis of the gyro. This torque causes the gyro to precess about its vertical axis to bring the compass back on the meridian. A metal plate or paddle that moves in a direction perpendicular to its length in a vessel containing a viscous fluid is attached to the weight. This arrangement damps out oscillations of the weight caused by roll or pitch of the ship. Two repulsion magnets are used to provide torque about the vertical axis of the gyro to dampen oscillations of the compass about the meridian.

The inverted pendulum of the Sperry Gyro-Compass Mark 18, Model 3 is a ballistic weight supported by two flat strip springs secured to the rotor case at a point below the weight and attached to the weight at a point above its center. This support is so flexible that the mass, while apparently designed to move in a direction parallel to the rotor axis, actually can move in almost any direction under acceleration forces. This freedom is exhibited by the constant random motion and oscillation of the damping magnet arm of the device. In addition, the spring support of the weight does not provide a linear spring force under horizontal acceleration in a northerly direction. This characteristic is indicated by the fact that equal increments in horizontal force applied to the weight do not cause equal increments in horizontal displacement in the weight. Furthermore, there is no consistent relation between the motion of the damping paddle and of the pendulous weight. The damper acts on the ballistic weight at a point below the center of gravity of the mass and the weight is supported by two flat strip springs secured to the rotor case at a point below the weight. As a result, the mass tends to rotate about the damper on its bottom as a pivot. This results not only in the mass responding to accelerations practically instantaneously but also provides very inefficient and unpredictable damping. Finally, the clearance between the supporting springs and the weight and the limit stops in the damper attached to the weight restrict the motion of the weight to such an extent as to prevent application of the correct ballistic deflection under many operating conditions.

The foregoing disadvantages are overcome substantially by the subject device, which employs a pendulum type suspension of the ballistic mass from a point near the top of the rotor case, and employs flexure-type hinges to eliminate friction about the ballistic weight suppotring axis. The gyro-compass damping structure disclosed incorporates clearances sufficient to permit response to as much plus or minus shift in the dynamic vertical as might be met under operating condition, and also provides for linear motion of the weight on northerly accelerations. In addition, with the pendulum-type suspension of the ballistic weight, the motion of the paddles is directly proportional to the motion of the center of gravity of the weight, so that uniform damping is obtained.

Accordingly, it is a principal object of this invention to provide an improved support for the ballistic weight of a gyro-compass, characterized by pendulous suspension of such weight.

Other objects and many of the attendant advantages of this invention will be readily appreciated as the same becomes better understood by reference to the following detailed description when considered in connection with the accompanying drawings wherein:

Fig. 1 is an elevation of a damping device for a gyro-compass, shown partly in section, and showing the gyro-compass rotor case and bearing in phantom, illustrating a preferred embodiment of the invention;

Fig. 2 is a section taken on the line 2—2 of Fig. 1, showing extended positions of the damping structure in broken lines;

Fig. 3 is a section taken on the line 3—3 of Fig. 1;

Fig. 4 is a plan view of the support member of the device; and

Fig. 5 is a plan view of the paddle-bracket member of the device.

Similar numerals refer to similar parts throughout the several views.

The support member 11 comprises a first leg portion 13 having a plurality of bores 15 carrying screws 17 whereby said support is secured to the rotor case 19 of a gyro-compass, a body-plate portion 21 adapted to lie flush with said rotor case, and a second leg portion 23 extending outwardly from said rotor case normal to said body-plate portion. Arms 25 extend laterally from each side of said leg portion 23, and the end of each arm is provided with a slot 27 and a crossbore 29 that is threaded to receive a screw 31, said slot and bore providing means to secure a flexible wire 33 that depends therefrom to provide a flexure type hinge. A bore 35 medial the forward portion of the leg portion 23 carries a fulcrum pin 37, said bore 35 being counterbored at both the upper and lower faces of said leg portion to permit said pin to rock in the manner hereinafter described.

Bracket 39 is an L-shaped plate having a plurality of bores in one leg aligned axially with the axes of the wires 33 and bore 35. The pin 37 is secured in one of said bores, as by tack welding of said pin to said leg, and the other of said bores are threaded to carry a wire-guiding assembly consisting of nuts 45 having axially tapered bores 47. The nether ends of wires 33 are secured by the lugs 49 that have axial bores that receive said wires and hold said wires by means of the setscrews 51. The lugs 49 are secured to the nether face of spring 41 as by tack welding and the spring 41 is attached to the nether leg of bracket 39 by screws 43. Spring 41 is provided to prevent kinking of the suspension wires 33 by keeping these wires under tension at all times.

Weight 53 is a lead annulus having a central opening of sufficient diameter to clear the protuberant portion of the bearing of rotor housing 19 when said weight is secured dependingly from bracket 39. The lower portion of said weight is of reduced thickness, as shown in Fig. 2, to increase the angular limit of swing thereof, as hereinafter described.

Gasket 55 and cap plate 57 are secured to the rotor bearing 59 by means of a plurality of screws 61 countersunk to lie flush with the face of said cap plate. Screws 81 and nuts 77 serve to secure bracket 79 to weight 53. The said weight 53 is also secured to bracket 39 by screws 85 and nuts 87.

A plurality of paddles 89 are secured to and depend from the legs 91 formed in the horizontally disposed portion of bracket 79, said paddles having their faces arranged in parallel spaced relation for movement in the plane of said faces.

Stud 93 and bracket 95 are secured to the rotor case 19 by screws 97. Said bracket 95 carries trough 99, which is subdivided into a plurality of compartments by spacer plates 101, communication of the fluid 103 between compartments being permitted through the slot 105 formed by the lower portion of each of said plates 101 and the floor of said trough. The spacer plates are so arranged that one of said paddles 89 can travel in the fluid in each of said compartments.

The damping fluid 103 is preferably a silicone fluid, which is characterized by its small temperature coefficient of viscosity, it being desirable to prevent variations in temperature from having an effect on the damping. Such fluid is of sufficient viscosity to retard the swing out of the ballistic weight on short swings, such as are obtained due to roll and pitch, to a sufficient amount to minimize intercardinal rolling error, but is not of such high viscosity as to prevent the pendulum from swinging out the proper amount to provide the correct ballistic deflection on high speed turns. A preferred fluid is Corning DC silicone fluid No. 200, which has a viscosity at 25° C. of 200,000 centistokes.

The wire-suspended pendulum hereinabove described tends to hang in the dynamic vertical, shown by the broken line 107 of Fig. 2. That dynamic vertical is the direction of the resultant of all the accelerations acting on the body, including that of gravity. Since the pendulum is suspended from the top of the rotor case, if the rotor axle moves out of the dynamic horizontal the pendulum moves with respect to the rotor case about its suspension. The center of gravity of the pendulum moves in an arc within the limits indicated in Fig. 2 by angles $a$ and $b$, changing the distance between its center of gravity and the horizontal rotor case pivot of the gyro rotor. This applies an anti-pendulous torque to the gyro rotor proportional to the sine of the tilt of the rotor. For relatively small angles, the anti-pendulous torque applied to the gyro rotor is virtually proportional to the tilt of the rotor.

Obviously many modifications and variations of the present invention are possible in the light of the above teachings. The invention disclosed herein is applicable to gyroscopic stable verticals and like devices. The suspension means can be a wide range of equivalent devices. Other modifications and changes suggest themselves readily to those skilled in the art. Accordingly, it is to be understood that within the scope of the appended claims the invention may be practiced otherwise than as specifically described.

I claim:

1. In a gyro compass having a rotor mounted in bearings in a rotor case, a first bracket having laterally extending arms mounted on the top portion of such case, a second bracket carrying a weight and a plurality of wires each secured to one of said arms and to said second bracket to maintain said brackets in spaced relation.

2. In a gyro compass having a rotor mounted in bearings in a rotor case, a first bracket having laterally extending arms and a bore medial a leg thereof, said bracket being secured to the top portion of such rotor case, a second bracket carrying a weight, a plurality of wires each secured to one of said arms and to said second bracket to maintain said brackets in spaced relation, and a pin carried by said second bracket extending into said bore to limit relative movement of said brackets.

3. In a gyro compass having a rotor mounted in bearings in a rotor case, a first bracket secured to the top portion of such rotor case, a leg of said bracket extending outwardly from the face of such case, said leg having laterally extending arms and a bore medial the outward portion of said leg, a second bracket carrying a weight and carrying a flat spring on its nether face, a plurality of wires each extending through bores in said second bracket and secured to one of said arms and to one of the free ends of said spring to maintain tension in said wire at all times and a pin carried by said second bracket extending into said bore to limit relative movement of said brackets.

BERNARD J. BAECHER.

References Cited in the file of this patent

UNITED STATES PATENTS

| Number | Name | Date |
| --- | --- | --- |
| 1,291,695 | Perry et al. | Jan. 14, 1919 |
| 1,773,412 | Thompson | Aug. 19, 1930 |
| 2,158,048 | Braddon | May 9, 1939 |
| 2,257,730 | Braddon | Oct. 7, 1941 |
| 2,464,516 | Kenyon | Mar. 15, 1949 |
| 2,510,068 | Carter | June 6, 1950 |